Sept. 11, 1923.
S. L. HURD
1,467,430
CUTTER HEAD FOR STUMP REMOVING AND CLEARING MACHINES
Filed April 29, 1922   3 Sheets-Sheet 3
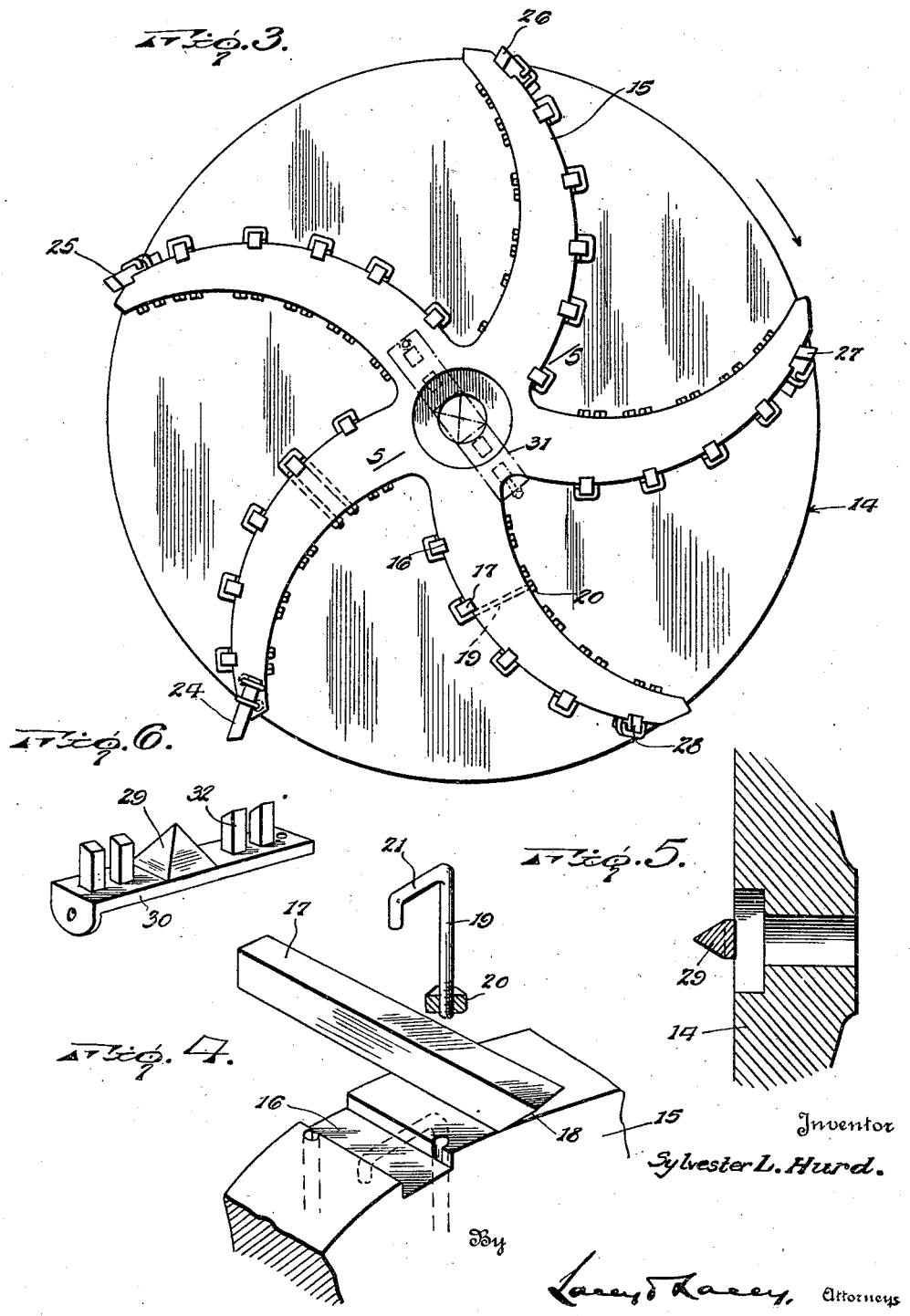
Inventor
Sylvester L. Hurd.
By
Lacey & Lacey, Attorneys Patented Sept. 11, 1923.

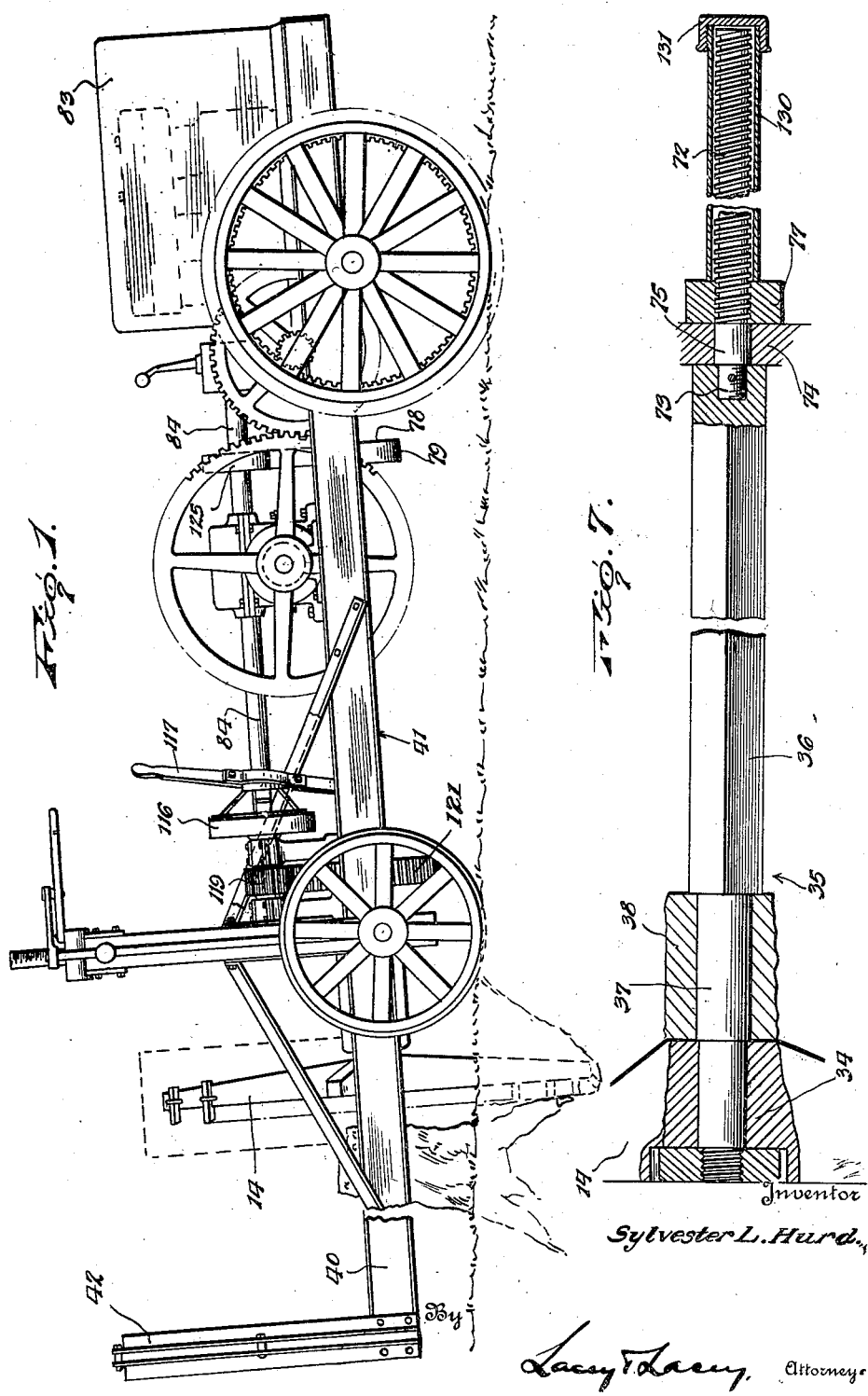

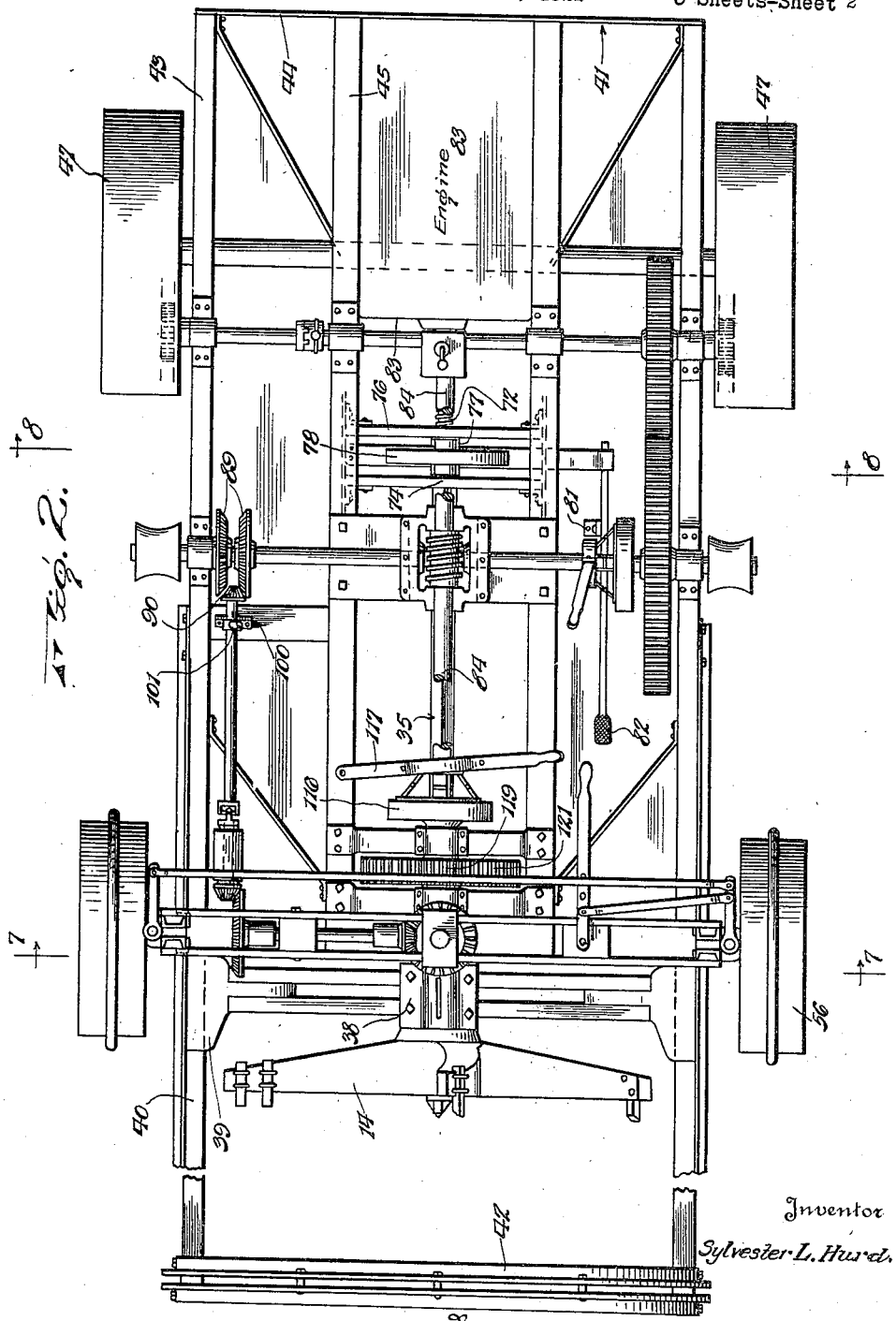

1,467,430

UNITED STATES PATENT OFFICE.

SYLVESTER L. HURD, OF NEW ORLEANS, LOUISIANA.

CUTTER HEAD FOR STUMP REMOVING AND CLEARING MACHINES.

Application filed April 29, 1922. Serial No. 557,465.

*To all whom it may concern:*

Be it known that I, SYLVESTER L. HURD, a citizen of the United States, residing at New Orleans, in the parish of Orleans and State of Louisiana, have invented certain new and useful Improvements in Cutter Heads for Stump Removing and Clearing Machines, of which the following is a specification.

The present invention relates to stump removing machines and has for its main object to provide a machine of this character that is able to remove a stump completely in a very short space of time. As a matter of fact, a tree stump of about thirty-six inches in diameter may be taken away in less than three minutes, including the time required for setting up the machine for doing the work, this preliminary operation actually taking the greater portion of the time. With ordinary stump removers the same work requires several hours.

Another object of the invention is to provide revolving knives or cutters to do the work, by means of which the tree stump as well as the roots to a depth of fifteen to eighteen inches below ground are completely cut away. These knives are mounted in staggered relation with respect to each other and detachably secured for easy exchange on a multiple armed cutting head.

Lastly, an axial feed and reversing device is provided for the cutting head.

Other objects and advantages of the invention will appear from the following description and the appended drawings and particularly pointed out in the claims, it being, however, understood that minor changes in the details of construction and arrangement of parts may be permissible without departing from the scope and spirit of the invention.

One embodiment of the invention is illustrated in the accompanying drawings—

Figure 1 shows a side elevation of the stump removing machine;

Figure 2 is a top plan view of Figure 1;

Figure 3 is a front elevation of the cutting head on a larger scale;

Figure 4 is a fragmentary perspective view of the knife-securing means;

Figure 5 is a partial transverse section on the line 5—5 of Figure 3;

Figure 6 is a perspective view of one detail;

Figure 7 is a side elevation in partial axial section of the driving shaft for the cutting head.

Referring first to Figures 3, 4, 5 and 6 showing the cutting head 14 and the knives, this head consists of a plurality of curved arms 15 which are bent in the opposite direction of rotation of the head 14 and the forward edge of each arm is provided with a plurality of recesses 16 each adapted to receive a cutting knife 17. These recesses are all running in the axial direction of the cutting head so that the knives 17 will point forward of the head and lay parallel to the axis of rotation. The cross section of each knife 17 is preferably square or rectangular, as seen in Figures 3 and 4, and the cutting edge 18 is beveled at an angle of approximately forty-five degrees. The knives are all spaced apart and set in staggered relation on the different arms, or, in other words, the radial distance from the axis of the cutting head to each knife differs so that each knife will make a cut in the tree stump which is located at a different radius from the axis of rotation and all the knives together will, in this manner, make a complete or continuous cut from near the center of the head to near its extreme periphery.

Each knife is secured by means of two L-shaped bolts 19 and nuts 20, the long shank of each bolt 19 being near one side and the short end thereof at the other side of the knife so that the connecting portion 21 will be placed transversely over the knife, as indicated in dotted lines in Figure 4.

Referring particularly to Figure 3 of the drawings, the radially positioned knife 24 is secured at the extreme outer end of one of the arms, while the next adjacent arm carries a knife 25 which stands at a slight angle to the knife 24, the knife 26 on the next arm being at a still greater angle with relation to the face of a cutting head, the knife 27 being nearly parallel to the axis and the knife 28 of the last arm being positioned parallel to the axis of rotation. These five additional knives 24 to 28 inclusive perform the radial cutting in the ground in front of the tree stump.

A center point 29 is provided on a plate 30 which is secured across the axis of the cutting head, as indicated at 31 in Figure 3. This point 29 is slightly longer than the knives so as to form a pilot and center for the cutting head. On the same plate are formed separate cutters 32 facing in the opposite direction on each side of the center point 29. These cutters 32 are integral with the plate 30, while all the other knives 16 and 24 to 28 inclusive are detachable and exchangeable in case they should be broken or damaged in any manner. The cutters 32 are also staggered.

The head 14 is securely mounted on the end 34 of the main shaft 35, see Figure 7. This shaft is of square cross section 36 along its greater length and has a cylindrical journal portion 37 adjacent the head, which journal portion 37 is carried in a slidable bearing 38, see Figure 2. This bearing has arms 39 which are adapted to engage with and slide along a pair of guideways or rails 40 extending in the forward direction from the main frame 41 of the machine. The forward ends of the rails 40 are preferably connected by means of a yoke 42 which rises above the rails with sufficient height to permit the cutting head 14 to pass under and beyond the same.

The frame 41 consists of two parallel outer channel beams 43 cross connected at their rear end, as at 44, by means of a flat bar but not forming part of the present invention, need no further description save that it is mounted in any suitable manner on the front and rear axles.

It will be noted that while the front axle together with the front wheels 56 remain stationary on the ground, the angularity in longitudinal direction of the main shaft 35 may be adjusted to a suitable position for the head 14 to attack the tree stump by some suitable mechanical device. During this adjustment, the entire main frame will oscillate around the axis of the rear wheels 47.

The main shaft 35 terminates at its rear end with a threaded portion 72 which may be rigidly secured in any suitable manner to the square portion 36 of the main shaft 35 or form an integral part therewith. As seen in Figure 7, the threaded portion 72 is screwed into the square portion 36, as indicated at 73. Adjacent to the square portion 36 is provided a bearing 74 for an unthreaded or cylindrical part 75 of the shaft of the same diameter as the threaded portion 72. It will now be understood that the main shaft 35 is carried at its forward end in the slidable bearing 38, but at its rear end is itself slidable in the bearing 74 which is rigidly secured between the I-beams 45 of the main frame, see Figure 2.

To the rear of the bearing 74 and between the same and the bracket 76, also secured between the I-beams 45, is inserted a split nut 77 engaging the threaded portion 72. This nut is, in this manner, held rigidly in axial direction but is ordinarily revoluble with the main shaft 35 and around the nut is mounted a sheave or disk 78. This disk is free to revolve but may be clamped by means of a brake 79 contacting with its outer periphery and actuated by means of the foot lever 80 which is pivoted, as at 81, and reaches forwardly in the frame terminating with the treadle 82, see Figure 2, in a convenient position for the operator of the machine.

It will be evident that by applying the brake 79 through the depression of the treadle 82, the sheave 78 will become stationary and clamp the nut 77 which will then compel the revolving main shaft 35 to advance through the intermediary of the threaded portion 72. Around the free end of the threaded portion 72 will be found a sleeve or jacket 130 which is closed by a cap 131 and extends to the rear of the machine and is secured beneath the engine in the main frame thereof. This sleeve serves the double purpose of guide and protection from dust for the screw portion 72 of the main shaft.

At the rear of the main frame is mounted the engine 83, the driving shaft 84 of which runs parallel with the main shaft 35 and above the same, as best seen in Figure 1. It will be understood that, when the engine is running and the driving shaft 84 revolving, the main frame may be raised or lowered together with the cutting head 14 in the front axle frame by throwing the pinion 90 into engagement with one or the other of the pinions 89. When the desired angular position of the main frame and the main shaft is obtained, the hand lever 101 is thrown into central or neutral position putting the pinion 90 out of mesh with both of the bevel gears 89.

The engine running and the driving shaft 84 revolving, the cutting head 14 will now be set in motion by the main shaft 35 and the intermediary of the gears 119 and 121 directly the clutch lever 117 has been thrown to engage the clutch 116.

From the foregoing description, it will be evident that the knives being staggered and possibly slightly overlapping each other in radial direction will produce a broad continuous cut from the center of the cutting head out to its periphery. It will also be evident that, by bending the arms as described only one of the knives at the time will be located in the vertical plane of cutting, which makes the cutting operation very easy, as only one knife cuts at the time. In this manner, all jerkiness of operation is excluded and the machine will operate with great ease and smoothness.

Having thus described the invention, what is claimed as new is:

1. In an implement of the class described, a power-driven cutting head provided with radially extending arms, said arms being curved in the plane of rotation of the head, a plurality of knives, means for detachably securing said knives in spaced lapping relation on said arms, on the convex side of each arm said knives being positioned parallel to the axis of the head, and an additional knife for each arm contiguous to the extreme end thereof.

2. In an implement of the class described, a power-driven cutting head provided with radially extending arms, said arms being curved in the plane of rotation of the head, a plurality of knives, means for detachably securing said knives in spaced lapping relation on said arms, said knives being positioned parallel to the axis of the head on the convex side of each arm, and an additional knife for each arm contiguous to the extreme end thereof, said additional knives being secured on said arms in different angular positions from radial to parallel with the axis of said head.

3. In an implement of the class described, a power-driven cutting head provided with radially extending arms, said arms being curved in the plane of rotation of the head, a plurality of knives, and means for detachably securing said knives in spaced lapping relation on said arms, said arms having spaced recesses on their convex sides adapted to seat said knives.

4. In an implement of the class described, a power-driven cutting head provided with radially extending arms curved in the plane of rotation of said head, a plurality of knives detachably secured in spaced lapping relation on said arms and on the convex side thereof, and collectively forming a radially continuous cutting tool.

5. In an implement of the class described, a power-driven cutting head provided with radially extending arms curved in the plane of rotation of said head, a plurality of knives detachably secured in spaced lapping relation on said arms, and on the convex side thereof, so as to collectively form a radially continuous cutting tool, and a portable structure upon which said cutting head is revolubly and adjustably mounted.

In testimony whereof I affix my signature.

SYLVESTER L. HURD. [L. S.]